W. D. KELLY.
MORTISING AND TENONING MACHINE.
APPLICATION FILED MAY 18, 1912.
1,083,366.
Patented Jan. 6, 1914.
5 SHEETS—SHEET 1.
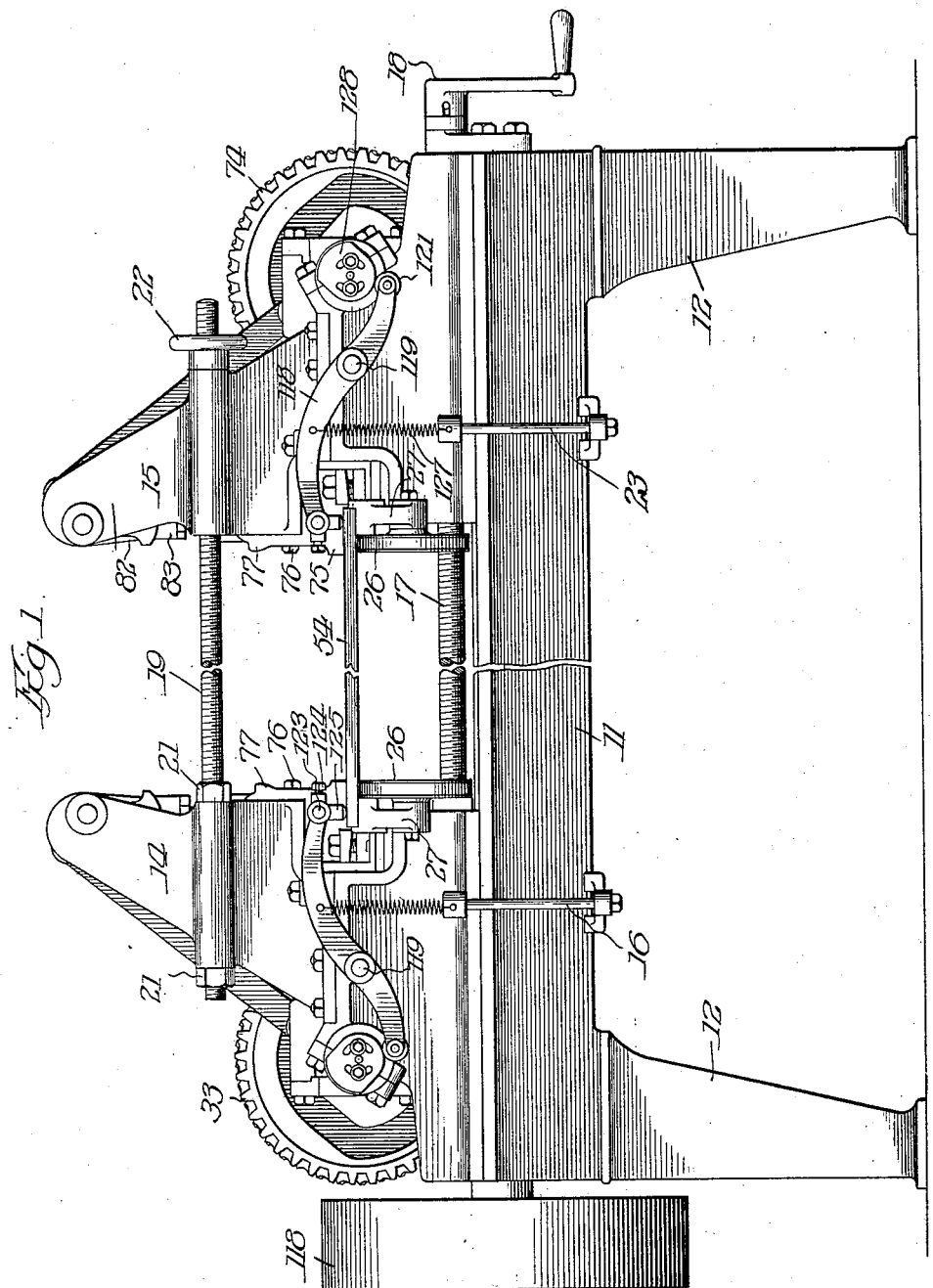

W. D. KELLY.
MORTISING AND TENONING MACHINE.
APPLICATION FILED MAY 18, 1912.
1,083,366.
Patented Jan. 6, 1914.
5 SHEETS—SHEET 2.
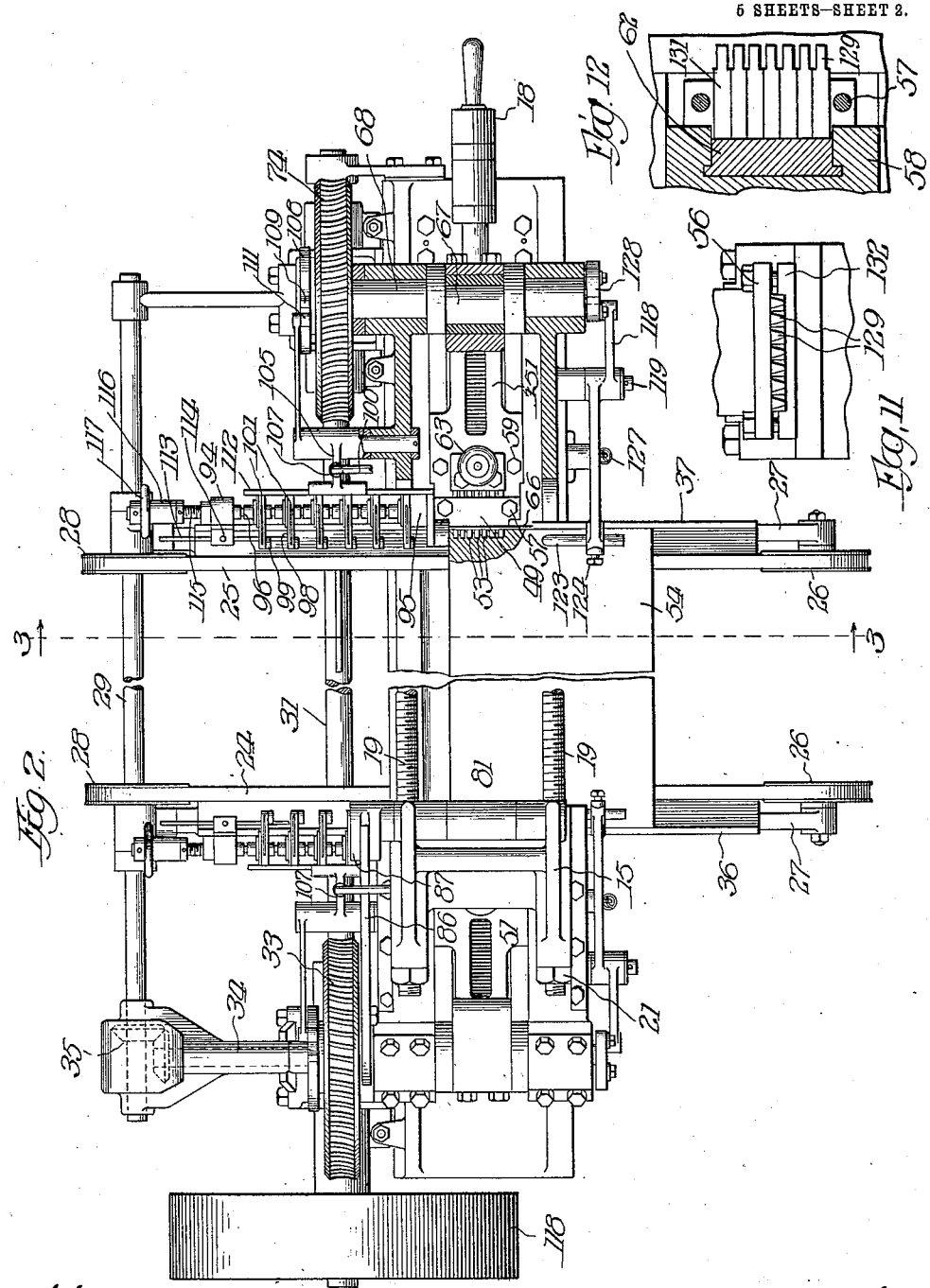

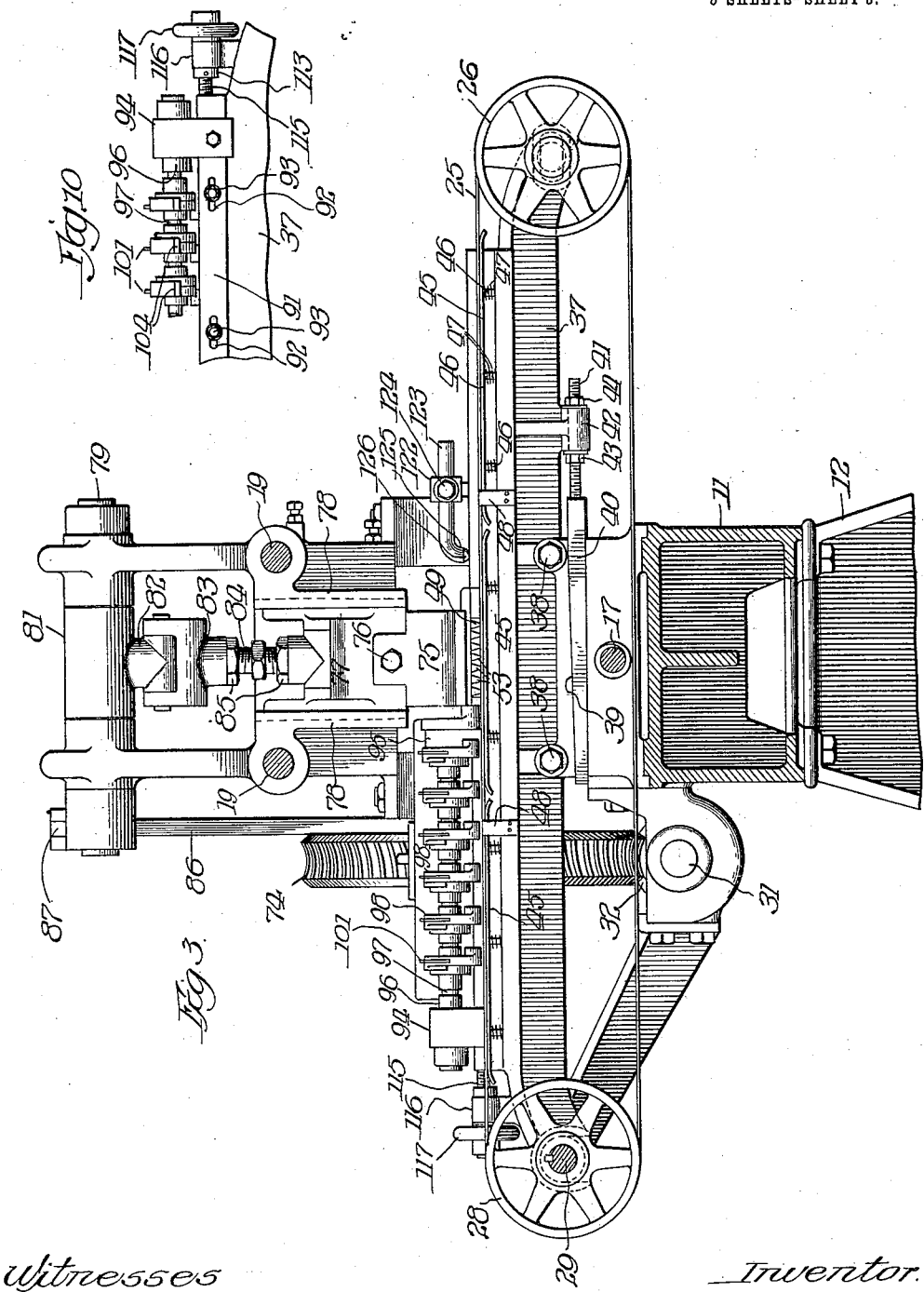

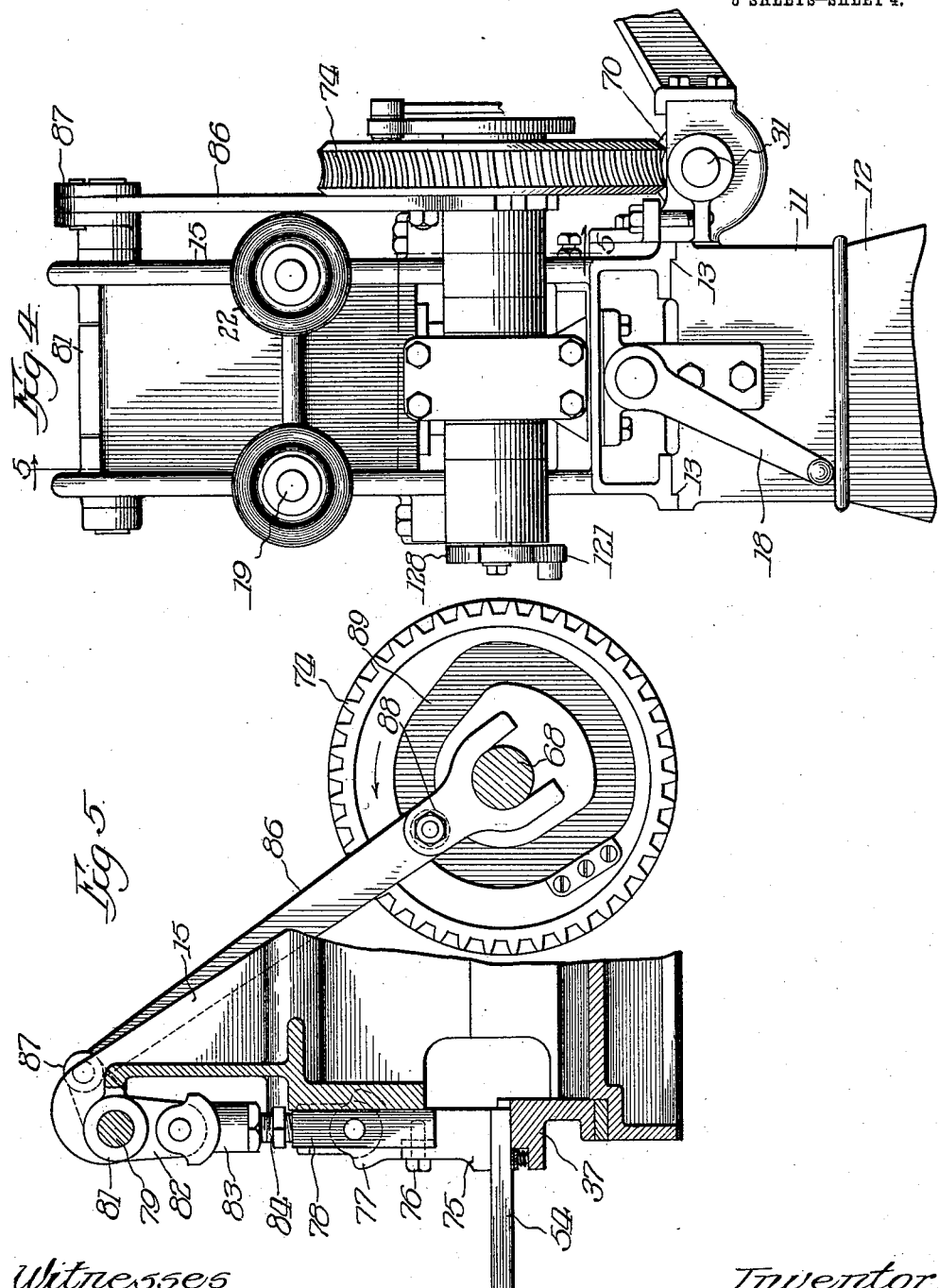

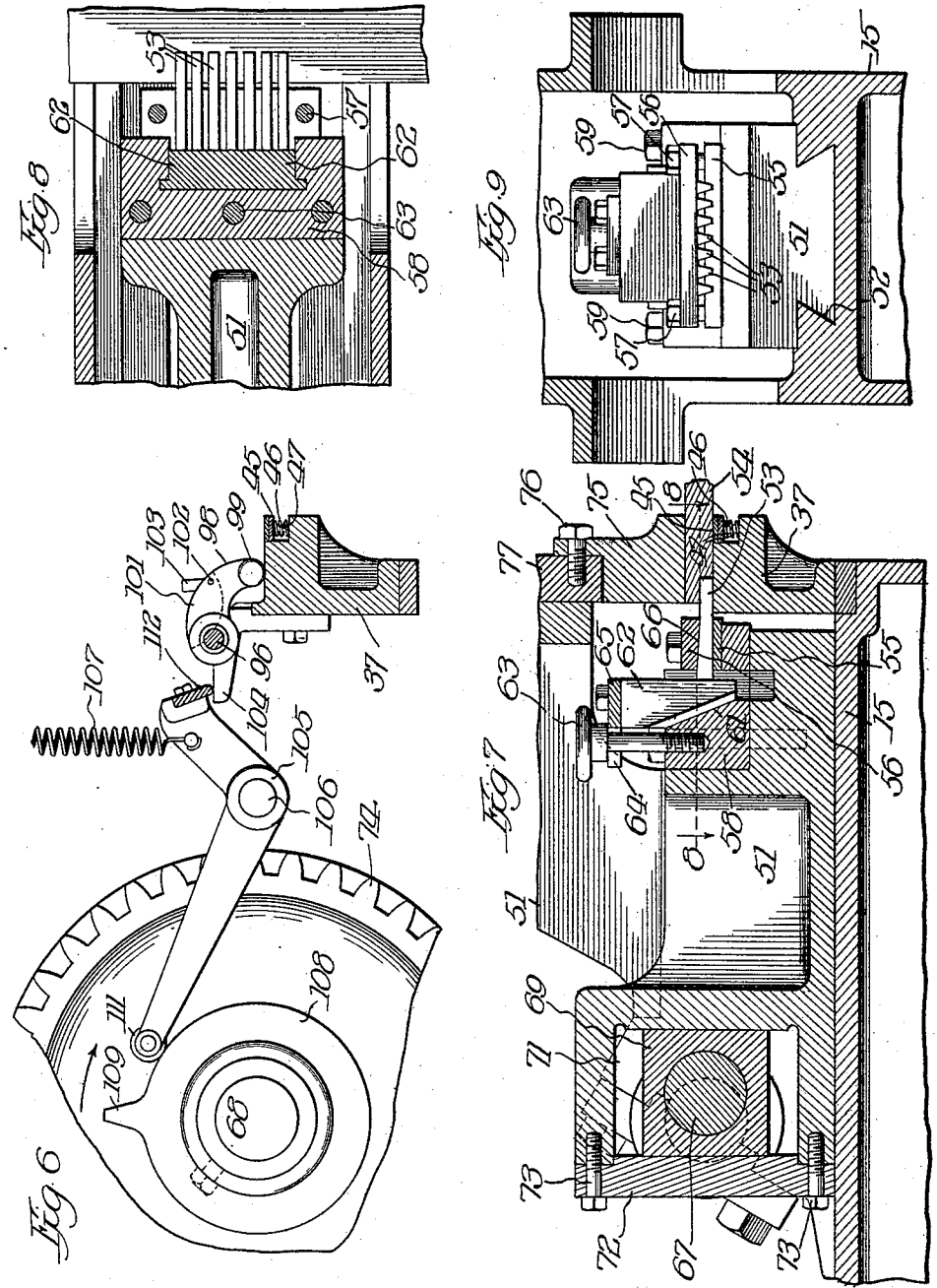

UNITED STATES PATENT OFFICE.

WILLIAM D. KELLY, OF CHICAGO, ILLINOIS, ASSIGNOR TO KELBUR MANUFACTURING COMPANY, OF CHICAGO, ILLINOIS, A CORPORATION OF ILLINOIS.

MORTISING AND TENONING MACHINE.

1,083,366.       Specification of Letters Patent.       Patented Jan. 6, 1914.

Application filed May 18, 1912. Serial No. 698,132.

*To all whom it may concern:*

Be it known that I, WILLIAM D. KELLY, a citizen of the United States, residing at Chicago, in the county of Cook and State of Illinois, have invented certain new and useful Improvements in Mortising and Tenoning Machines, of which the following is a specification.

This invention relates in general to wood working machines and more particularly to a machine for making mortises and tenons of the blind mortise, open mortise, or dovetail type in the ends of the boards or strips of wood, the present invention constituting an improvement upon the general type of machine disclosed in my former Patent 850,888, granted April 16, 1907.

One of the objects of the present invention is the provision of a machine of this general character which will automatically advance the work or stock to the operating tools designed to form mortises and tenons in the ends of the stock by forcing sections of the wood into the body of the stock, which will automatically clamp the work during the operation of the tools to prevent the stock from splitting or bulging and will also automatically advance the stock a predetermined distance after each successive operation of the tools.

Another object is to provide a machine to one side of which the stock may be fed, the advancing of the stock and the mortising and tenoning operations being performed entirely automatically by the machine so that the stock will be delivered at the opposite side of the machine with the mortises and tenons completely formed therein.

A further object is the provision of means for adjusting the machine to operate upon stock or work of various lengths and also to provide means for regulating the advance of the work in accordance with the width of the tenons and mortises being formed therein.

An additional object is to provide an improved and novel mortise and tenon forming tool so constructed that the length of the mortise forming punches can be adjusted and also so that the punches may be readily removed and replaced when desired.

Other objects and advantages of the invention will be apparent as it is better understood by reference to the following description when considered in connection with the accompanying drawings illustrating one preferred embodiment thereof.

Referring to the drawings, Figure 1 is a side elevation of a mortising and tenoning machine incorporating my invention. Fig. 2, is a plan view thereof. Fig. 3, is a transverse sectional view taken on the line 3—3 of Fig. 2. Fig. 4 is an end view of the machine looking toward the left in Figs. 1 and 2, certain parts being omitted; Fig. 5 is a sectional view taken on the line 5—5 of Fig. 4; Fig. 6 is a fragmentary view showing one of the stops and the operating mechanism therefor; Fig. 7 is a fragmentary longitudinal sectional view through one of the mortising and tenoning tools and its operating slide; Fig. 8 is a sectional view on the line 8—8 of Fig. 7; Fig. 9 is a fragmentary view looking toward the operating end of one of the tools; Fig. 10 is a fragmentary view of the stop rod adjusting device; Fig. 11 is an end view of a modified form of mortising and tenoning tool; and Fig. 12 is a plan view partially in section of the tool shown in Fig. 11.

From the drawings it will be observed that the present machine comprises a base or frame 11 supported upon suitable standards or pedestals 12, and shaped to provide on its upper surface a plurality of tracks or guideways 13 upon which one or both of the housings 14 and 15 are adapted to travel. Ordinarily the housing 14 is stationarily clamped to the frame by suitable clamping bolts 16, or other preferred means, while the housing 15 is adapted to be moved toward and from the housing 14 to permit the accommodation between the housings of stock of various lengths, the adjusting movement of the housing 15 being effected by a screw 17 which is in threaded engagement with the base of the housing and is equipped at one end with an operating handle 18. It will be obvious that by turning the handle the housing 15 may be advanced toward or withdrawn from the housing 14 in conformity with the length of the stock to be operated upon. A pair of threaded rods 19 secured to the housing 14 by nuts 21 project through suitable sockets in the housing 15 and are provided with hand locking wheels 22 adapted to be threaded into engagement with the housing to lock the same in adjusted position against movement away from the housing 14. Clamping bolts 23 may also be employed to assist in maintaining the housing 15 in adjusted position.

The work or stock to be operated upon is advanced across the machine between the housings 14 and 15 by means of endless belts 24 and 25 constituting a conveyer upon which the work is placed at the feed side of the machine positioned at the right in Fig. 3. The belts are trained over the pulleys or wheels 26, supported upon suitable arms or brackets 27 at the feed side, and encircle the drive pulleys 28 splined to the shaft 29 at the delivery side of the machine which shaft is constantly driven from the main drive shaft 31 through the intermediary of a worm 32, worm wheel 33, transverse shaft 34 and the beveled gears 35. The work supports 36 and 37, at the ends of which the wheels 26 and 28 are mounted, are fixed to the housings 14 and 15 respectively by suitable bolts 38 or other fastening means. In order that the supports may be adjusted vertically relative to the housings to support the work at the required height I have interposed a wedge block 40 between the base of each housing and the inclined face 39 of the supports so that by adjusting the block longitudinally the supports may be raised and lowered the required amount. A bolt 41 projects from the end of the block through a journal or socket 42, and the adjustment of the block is effected by means of nuts 43 and 44 which also serve to lock the block in adjusted position.

The belts 24 and 25 are arranged to travel over the inner edges of their respective work supports and for the purpose of holding the belts up into operative engagement with the stock disposed on the supports, but to permit them to be depressed so that they will travel beneath the stock when the same is restrained by mechanism which will be hereinafter described, I have provided the supporting plates or members 45 equipped with studs or pins 46 which project into suitable sockets in the supports, the plates being normally urged upwardly by suitable expansion springs 47. To hold the belts in proper alinement on the plates 45 a plurality of guides 48 are mounted on the supports to project upwardly adjacent the edges of the plates. It will be manifest that the belts are normally held by the plates 45 slightly above the upper surfaces of the supports so that when the stock is laid on the belt at the feed side of the machine it will be carried along or advanced by the belts by reason of the frictional engagement between the stock and upper surfaces of the belts. The springs 47, however, will permit the belts to be slightly depressed when the stock is restrained with the result that the conveyer travels continuously while the stock is advanced by an intermittent motion.

The housings 14 and 15 and the mechanisms carried thereby are substantially identical and a detailed description of one of the housings with the mechanisms connected therewith will be sufficient for an understanding of the present invention since it will be understood that the other housing and mechanisms carried thereby are counterparts of those described hereinafter.

The housing 15 is equipped with a mortising and tenoning tool designated generally by 49, (Figs. 2 and 3) which is mounted on a slide 51 (Fig. 7) adapted to reciprocate in an undercut groove or guide-way 52 formed in the base of the housing. The tool itself, as will be evident from Figs. 7, 8 and 9, comprises a series of punches 53 which may be of any suitable cross-sectional shape but in the present instance they are shown as tapered from top to bottom to produce undercut or dove-tail mortises when they are forced into the stock 54 as shown in Fig. 7. The punches are arranged in parallel relation between the lower and upper clamping plates 55 and 56 respectively, the lower plate being preferably grooved to receive the punches and maintain them in proper spaced relation. The plates are drawn together to clamp the punches therebetween by means of suitable bolts 57. When it is desired to replace or renew one or more of the punches the bolts are loosened to relieve the pressure upon the plate 56 whereupon the punches may be readily withdrawn. A block 58 is secured upon the inner end of the slide 51 by bolts 59 or other fastenings, and the shoulder 61 of the block is inclined opposite the inner ends of the punches as shown in Fig. 7. An adjusting block 62 having a similarly inclined face adapted to abut against the inclined face 61 is interposed between the ends of the punches and the block 58, this adjusting block being adapted to be adjusted vertically by means of an adjusting bolt 63 passing through an elongated slot 64 in the top plate or integral ear 65 and threadingly engaging in a tapped opening in the block 58. It will be apparent that the punches may be adjusted to project their outer ends any required distance by simply adjusting the vertical position of the block 62. In order to prevent the punches from being withdrawn their upper sides are preferably slightly inclined as shown at 66 (Fig. 7), and the lower face of the clamping plate 56 is similarly inclined so that withdrawal of the punches when the plate 56 is clamped down is prevented by the wedging action between the punches and the plate.

The slide 51 is reciprocated to force the punches into the stock at the required time by means of the eccentrically disposed portion 67 of the shaft 68 which portion is embraced by a bearing block 69 disposed in a recess 71 of the slide and retained in position therein by a retaining plate 72, suitable bolts 73 being provided to lock the plate in position. The shaft 68 is continuously rotated from the drive shaft 31 by means of a worm 70 engaging with a worm wheel 74 synchronously with the rotation of the shaft 34 journaled in the opposite housing 14. At each revolution of the shaft 68 the mortising and tenoning tool is reciprocated to force the punches into the end of the stock disposed on the work supports between the housing with the result that a plurality of mortises and tenons are formed at each actuation of the tool.

In order to prevent splitting or bulging of the stock when the punches are forced into the end thereof to produce the mortises and tenons, I have provided a backing member or clamping head which is automatically brought into engagement with the upper surface of the stock just prior to each actuation of the tool to firmly clamp the stock between the head and the work support. The backing member or clamping head indicated by 75 is secured by a bolt 76, or other means, to a cross head 77 adapted to be reciprocated between vertical guides 78 formed on the housing 15. A rock shaft 79 journaled at the upper end of the housing above the cross head has a sleeve 81 fixed thereon and equipped with an arm 82 to which is pivotally connected a link 83. The free end of this link and the cross head are tapped to receive the oppositely threaded ends of a connecting bolt 84 by means of which the link and the cross head are adjustably connected together, suitable locking nuts 85 being provided to lock the bolt in adjusted position. The shaft 79 is oscillated at predetermined intervals by a link 86 connected with the free end of an arm 87 fixed to the shaft 79, the other end of the link being bifurcated to embrace the shaft 68 and having a follower or roller 88 mounted thereon in position to engage in a cam track 89 formed on the inner face of the worm wheel 74. At each revolution of the shaft 68 the shaft 79 is oscillated to straighten out the toggle connection between the arm 82 and the cross head 77 so that the clamping head 75 is forced into operative engagement with the stock 54 to firmly clamp the stock against the work support 37 as shown in Fig. 5. Upon further rotation of the shaft 68 the arm 82 is swung to the right viewing Fig. 5 to break the toggle connection and withdraw the clamping head from operative position. The movement and pressure of the clamping head may be regulated to stock of various thickness by turning the adjusting bolt 84 to increase or diminish the distance between the link 83 and the cross head. When stock having bent ends is to be operated upon a head shaped to correspond to the shape of the stock may be substituted for the head 75 and a plate or block correspondingly shaped may be fixed to the work support beneath the head to support the curved stock during the operation of the tool.

Since the conveyer or feed belts by which the work is advanced are continuously operated, I have provided mechanism for restraining or stopping the movement of the stock at predetermined positions relatively to the mortising and tenoning tools. To this end I have provided a plurality of automatically operated stops adapted to be disposed in the path of travel of the stock and which will now be described.

Upon the outer face of the work support 37 there is adjustably mounted a bar 91 provided with elongated slots 92 through which extend bolts 93 for securing the bar or plate in position. The bar 91 is provided adjacent its ends with upstanding lugs or bearings 94 and 95 in which a shaft or rod 96 is supported. The rod is provided with a series of circumferential grooves 97 spaced apart a distance equal to the spacing of the tool punches. Upon the rods are mounted a plurality of stops 98, one of which is shown on an enlarged scale in Fig. 6. Referring to this figure it will be seen that the stop comprises a downwardly curved portion terminating in an abutment 99 normally disposed, under the influence of gravity, above the work support 37 and in the path of travel of the stock. The top of the stop is slotted to accommodate a locking member 101 pivoted at 102 and provided with an upwardly extending finger piece 103. The locking member, when in the normal position shown in Fig. 6, engages in one of the grooves 97 to lock the stop against movement longitudinally of the rod 96 but, should it become desirable to adjust the stop on the rod, the locking device may be readily released by pressing the finger piece to the right whereby the locking member is swung on its pivot out of engagement with the rod. The stop terminates outside of the rod in an extension or tail 104 by means of which the stop is oscillated on the rod to lift the abutment 99 out of the path of the stock on the work support when the stock is to be advanced.

For the purpose of elevating or withdrawing the stops from operative position I have provided a bell crank lever 105 pivoted on the housing 15 at 106 and normally held in the position shown in Fig. 6 by a contraction spring 107 secured at one end to the short arm of the lever and at its other end to a pin 100 projecting from the side of the housing. A cam 108 is fixed on the shaft 68 outside the worm wheel 74 and is provided with a high portion 109 adapted at each revolution of the shaft to engage with a follower 111 mounted upon the end of the long arm of the lever whereby said lever is rocked on its pivot to depress the tails 104 of the stops. A bar or rod 112 fixed to the end of the short arm extends over the tails of all the stops on the rod 96 so that they are all simultaneously actuated at each operation of the cam. The inner stop is usually disposed close to the tool 49, as shown in Figs. 2 and 3, so that when the stock is advanced to operative position by the conveyer it will abut against this stop and be restrained in position to permit the formation of mortises and tenons in the end thereof and adjacent the forward edge. Immediately after the tool is withdrawn from operative position the stops are elevated by the bell crank lever, as previously described, whereupon the stock will be advanced again by the carrier. The tools may be made of the same or greater width than the pieces of stock but, in some instances, the stock is wider than the tool, thereby necessitating a number of operations of the tool on each piece of stock, in which case it is desirable that the advance of the stock be again restrained after it is moved a distance equal to the width of the tool. It will be observed that the high portion 109 of the cam 108 is very short, consequently, the stops will be quickly released and permitted to drop into operative position under the influence of gravity. The inner stop, of course, will drop upon the top of the stock which has been advanced but the next stop will drop in front of the advancing stock and prevent its movement beyond a predetermined distance. The stops are similarly actuated after each operation of the tool with the result that the work is intermittently advanced a distance equal to the spacing of the stops.

If relatively narrow stock is being operated upon its advance need not be restrained after the mortises and tenons have been formed entirely across its ends, therefore, it may not be necessary to employ the stops 98 more remote from the tool. For the purpose of holding the stops in inoperative position I have mounted a rod 113 in a lateral extension of the bearing 94 which rod may be projected beneath one or more of the stops, as shown in Fig. 2, and held in projected position by a set-screw 114. These stops will be supported by the rod above the path of travel of the stock so that when the stock reaches this position it may be carried by the conveyer to the delivery side of the machine without further restraint.

Since the number and size of the punches in the tool may be varied as occasion requires, it is desirable that the stops be adjustable toward and from the tool not only to position the inner stop the requisite distance from the tool, but also in order that the remaining stops may be positioned in conformity with the inner stop. I have accordingly provided an adjusting screw 115 (Fig. 10), mounted in a bearing 116 formed on the work support and threadedly engaging in the end of the bar 91. By loosening the bolts 93 the bar may be adjusted longitudinally carrying with it the rod 96 and the stops thereon upon turning the hand wheel 117 fixed to the end of the screw.

If the successive pieces of stock were permitted to follow each other in close relation so that their edges abutted it will be manifest that no space would be provided between the pieces into which the stops 98 might drop to restrain the advance of the work. To obviate this difficulty I have provided a retarder which retards the advance of the stock during the operation of the tool so that the successive pieces of stock will not follow each other in close relation but will be spaced apart a distance sufficient to permit the operation of the stops. This retarding device comprises, as will be evident from Figs. 1, 2 and 3, a lever 118 pivoted on the housing 15 at 119 and provided at its rear end with a follower 121 and at its forward end with a socket 122. A rod 123 is adjustably held in the socket by a set screw 124 the inner end of the rod being downturned as indicated by 125 and preferably equipped with a rubber or other frictional pad 126. A contraction spring 127 fixed at one end to the lever 118 and at its other end to the housing, normally holds the friction pad in engagement with the work to prevent its advance, but upon each rotation of the shaft 68 a cam 128 mounted on the end thereof elevates the forward end of the lever to lift the retarder from operative position thereby permitting advance of the stock proportionately to the advance of the preceding piece.

In the modified form of tool shown in Figs. 11 and 12 the punches instead of being made the same shape throughout their length comprise a punching portion 129 shaped to produce the desired form of mortises and projecting from a body portion 131 which is substantially rectangular in cross-section. The lower clamping plate 132 in this instance is provided with an elongated flat depression in which the body portions of the punches are adapted to fit, the punches being clamped in position by the upper clamping plate 56 in the manner previously described. In this form of tool the body portions of the punches are accurately machined so that they are all of the same height and width and the depression in the plate 132 is accurately milled so that the punches will fit tightly therein. The body portions of various punches may be of different widths to secure different spacings, if desired, and one or more of the punches may be omitted and a suitable filler block substituted therefor should the character of the work require a greater spacing of the punches.

The embodiment of my invention which has been described operates as follows: After the distance between the housings 14 and 15 has been adjusted by means of the handle 18 to space the work supports 36 and 37 a requisite distance, depending upon the length of the stock to be operated upon, the pieces of stock may be deposited manually or by a mechanical feed device upon the receiving ends of the supports. It will be understood that the pulleys 28 are free to slide longitudinally on the shaft 29 and that the work support, conveyer belt, the mortising and tenoning tool, the clamping head, the stops, the retarder and other associated mechanism carried by the housing 15, are carried bodily by the housing during its adjusting movement. The various mechanisms are operated from the drive shaft 31 which receives its power through the pulley 118 from any suitable source, the entire operation being automatically controlled so that no manual operation is necessary after the work has been deposited on the supports. The conveyer belts 24 and 25 will advance the work toward the oppositely disposed mortising and tenoning tools, the retarders, however, serving to maintain the various pieces of stock in spaced relation. When the forward edge of the stock abuts against the inner stop its further advance is prevented. The stock at this time is in position for the initial operation of the tools which are brought into engagement with the stock to punch the mortises therein and then withdrawn, the stock being prevented from splitting and bulging during the operation of the tools by the clamping heads 75. The stops are then elevated to permit further advance of the stock a sufficient distance so that the next operation of the tools will form mortises and tenons similar to and forming a continuation across the ends of the stock of those already produced. As these operations are continued the stock advances by an intermittent movement toward the delivery side of the machine and when its forward edge passes beyond the zone of the stops it is free to be delivered over the pulleys 28. The height of the housings, the length of the punches, and the position of the stops may be adjusted to suit the requirements of the particular stock being operated upon in the manner previously described.

It is believed that my invention, its mode of operation and many of its attendant advantages will be understood from the foregoing without further description and it will be obvious that various deviations in structure from the particular construction shown and described may be resorted to without departing from the spirit of the invention or sacrificing any of the material advantages thereof.

I claim

1. In a mortising and tenoning machine, the combination of a mortise and tenon forming tool comprising a plurality of end thrust punches each adapted to force a section of the wood into the body of the stock, continuously operating means for feeding the work to the tool, means causing a yielding engagement of the feeding means with the work, means for actuating the tool, means for clamping that portion of the work operated on by the tool during the operation of the tool, and means permitting the stock to be fed by said continuously operating feeding means a predetermined distance only after each operation of the tool.

2. In a mortising and tenoning machine, the combination of a work support, a plurality of mortise and tenon forming tools comprising a plurality of punches each adapted to force a section of the stock into the body thereof to produce a mortise, continuously operating means for automatically feeding the stock into position between the tools, yielding means for urging the feeding means into engagement with the stock, means for operating the tools to produce a plurality of mortises and tenons in each end of the stock, means for clamping the ends of the work against the work support during the operation of the tools to prevent splitting thereof, and means for permitting the work to be carried by said continuously operating feeding means from the tools toward the delivery end of the work support a predetermined distance only after each operation of the tools.

3. In a mortising and tenoning machine, the combination of a work support, an endless carrier traveling across said support, means for yieldingly urging the carrier into engagement with the stock on the support, an end thrust mortise and tenon forming punching tool adapted to be projected onto the work support, means for stopping the stock being fed by the carrier in operative relation to the tool, an automatically operated clamping block between which and the work support the end of the stock is clamped during the operation of the tool, and mechanism for controlling the position of said stopping means whereby the travel of the stock is limited to a predetermined advance after each operation of the tool.

4. In a mortising and tenoning machine, the combination of a plurality of housings, a reciprocatory end thrust punching tool mounted in each of said housings, means for feeding the stock into operative position between said tools, means for advancing and retracting said tools simultaneously to produce a plurality of mortises and tenons, and means for automatically clamping the ends of the stock to prevent displacement of the material of the stock outside the plane of its faces during the operation of the tools.

5. In a mortising and tenoning machine, the combination of a frame, a plurality of housings mounted in said frame, mortise and tenon forming tools carried by said housings, means for intermittently operating said tools, parallel work supports carried by said housings, each support being adapted to sustain one end of the stock, an endless conveyer disposed adjacent to each support, means for yieldingly urging said conveyers into engagement with the stock sustained by the supports, and means for automatically clamping the work against said supports during the operation of the tools.

6. In a mortising and tenoning machine, the combination of a pair of parallelly disposed work supports each adapted to sustain one end of the stock, means for varying the distance between said supports for the accommodation of stock of various lengths, means whereby the height of each support may be independently adjusted, end thrust punching tools mounted adjacent said supports, mechanism for projecting said tools into operative engagement with the stock on the supports, means for automatically clamping the ends of the stock during the operation of the tools, a continuously operating conveyer for feeding the stock along the supports, and automatically operated stops adapted to be intermittently disposed in the path of travel of the stock whereby the stock is retained in position to be operated upon by the tools.

7. In a mortising and tenoning machine, the combination of a housing, a work support, an end thrust punching tool mounted in the housing to reciprocate transversely of the work support, a clamping head mounted on the housing to reciprocate toward and from said work support, and means for reciprocating said clamping head and tool whereby the stock is clamped between the work support and the head to prevent splitting while the tool forces sections of the wood into the body of the stock to produce mortises and tenons.

8. In a mortising and tenoning machine, the combination of a pair of housings, a work support fixed to each housing, means for adjusting the relative positions of the housings for the accommodation of stock of various lengths, a clamping head mounted on each housing to reciprocate toward and from the adjacent work support, an end thrust punch mounted to reciprocate in each of said housings transversely of the work supports, means for automatically advancing the stock, means for simultaneously operating said end thrust punches and clamping heads to clamp the stock and prevent splitting and simultaneously produce a mortise and tenon in each end of the clamped stock by forcing sections of the wood into the body of the stock.

9. In a mortising and tenoning machine, the combination of a work support, a continuously operating conveyer for moving the work across said support, a mortise and tenon forming tool, means for intermittently reciprocating said tool, a rod, a plurality of stops adjustably mounted thereon, said stops being normally disposed in the path of travel of the work on the support, and means for automatically moving said stops into inoperative position after each operation of the tool to permit a predetermined advance of the work.

10. In a mortising and tenoning machine, the combination of a mortise and tenon forming tool, means for advancing the stock relatively to the tool, means for intermittently operating the tool, a rod provided with a plurality of circumferential grooves spaced apart, adjustable stops mounted on said rod, means for engaging in said grooves to lock the stops in adjusted position on the rod, and means for automatically oscillating the stops on the rod to permit a predetermined advance of the stock.

11. In a mortising and tenoning machine, the combination of a mortise and tenon forming tool, continuously operating means for advancing the stock relatively to the tool, a retarder mounted at the feed end of the machine and adapted to frictionally engage and retard the advance of the stock toward the tool, and a plurality of stops for intermittently restraining the advance of the stock from the tool.

12. In a mortising and tenoning machine, the combination of a housing, a mortise and tenon forming tool mounted to reciprocate in said housing, means for advancing the stock relatively to the tool, a retarder mounted at the feed end of the machine, automatic means for causing said retarder to intermittently engage with the stock to retard its advance toward the tool, a plurality of stops spaced apart at predetermined distances and normally disposed in the path of travel of the stock at the delivery end of the machine, and means for intermittently actuating said stops to permit a predetermined advance of the stock from the tool.

13. In a mortising and tenoning machine, the combination of a frame, a shaft mounted thereon, means for advancing the work, means for forming mortises and tenons therein by a punching action, means for automatically clamping the work during the mortising and tenoning operation to prevent splitting of the work, means at the feed in end of the machine for retarding the advance of the work toward the mortising and tenoning means, means at the delivery end of the machine for intermittently stopping the advance of the work from the mortising and tenoning means, and connections between said shaft and each of said means whereby all of said means are operated from said shaft.

14. In a mortising and tenoning machine, the combination of a mortising and tenoning tool, continuously operated means for advancing the work relatively to the tool, a plurality of stops mounted in the path of the work to check its advance at predetermined points in its travel, means for intermittently withdrawing said stops, and means for holding one or more of said stops in inoperative position.

15. In a mortising and tenoning machine, the combination of a housing, a pair of punch-holding plates mounted to reciprocate in said housing, a plurality of end thrust punches disposed between said plates, means for adjusting the position of the punches, means for clamping the punches in adjusted position between the plates, and means for reciprocating said punches longitudinally to force sections of wood into the body of the stock.

16. In a mortising and tenoning machine, the combination of a housing, a tool holder mounted to reciprocate in the housing, a tool comprising a plurality of end thrust punches, a wedge block engaged with the inner ends of said punches, means for adjusting said block to vary the position of the punches, and means for clamping the punches in adjusted position.

17. In a mortising and tenoning machine, the combination of a plurality of housings, a work support carried by each housing, each support being adapted to sustain one end of the work to be operated upon, means for adjusting the supports toward and from each other to accommodate work of various lengths, and means including a cam block and operating mechanism therefor for adjusting the height of each support independently of the other.

WILLIAM D. KELLY.

Witnesses:
 IRA J. WILSON,
 M. A. KIDDIE.

Copies of this patent may be obtained for five cents each, by addressing the "Commissioner of Patents, Washington, D. C."